(12) United States Patent
Nishihara et al.

(10) Patent No.: US 6,384,143 B1
(45) Date of Patent: May 7, 2002

(54) RUBBER COMPOSITION

(75) Inventors: Hajime Nishihara, Yokohama; Shinichi Shibayama, Kawasaki, both of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/701,292

(22) PCT Filed: Apr. 13, 2000

(86) PCT No.: PCT/JP00/02400

§ 371 Date: Nov. 28, 2000

§ 102(e) Date: Nov. 28, 2000

(87) PCT Pub. No.: WO00/61681

PCT Pub. Date: Oct. 19, 2000

(30) Foreign Application Priority Data

Apr. 13, 1999 (JP) .............................. 11-104722

(51) Int. Cl.$^7$ .................. C08L 23/02; C08L 23/08; C08L 23/26; C08L 53/02
(52) U.S. Cl. .................. 525/191; 525/213; 525/222; 525/232; 525/240; 525/241
(58) Field of Search ................. 525/191, 213, 525/222, 232, 240, 241

(56) References Cited

U.S. PATENT DOCUMENTS

| 4,202,801 | A | | 5/1980 | Petersen | |
|---|---|---|---|---|---|
| 6,255,399 | B1 | * | 7/2001 | Castellani et al. | .......... 525/232 |
| 6,268,438 | B1 | * | 7/2001 | Ellul et al. | .................. 525/240 |

FOREIGN PATENT DOCUMENTS

| EP | A1452089 | 10/1991 |
|---|---|---|
| EP | a2634453 | 1/1995 |
| EP | A1751182 | 1/1997 |
| JP | a6295334 | 5/1987 |
| JP | A711067 | 1/1995 |
| JP | A10287775 | 10/1998 |

\* cited by examiner

*Primary Examiner*—Nathan M. Nutter
(74) *Attorney, Agent, or Firm*—Birch, Stewart, Kolasch & Birch, LLP

(57) ABSTRACT

A rubber composition which contains a thermoplastic crosslinked product comprising 1–99 parts by weight of an ethylene-α-olefin copolymer (A) containing an ethylene unit and an α-olefin unit of 3–20 carbon atoms and prepared using a metallocene catalyst and 1–99 parts by weight of an olefin resin (B) (the total amount of (A) and (B) being 100 parts by weight), the crosslinking degree of (A) being not less than 50%, and 1–500 parts by weight of a thermoplastic elastomer (C) added later to the crosslinked product.

9 Claims, 1 Drawing Sheet

RUBBER COMPOSITION

This application is the national phase under 35 U.S.C. §371 of PCT International Application No. PCT/JP00/02400 which has an International filing date of Apr. 13, 1999, which designated the United States of America.

TECHNICAL FIELD

The present invention relates to a rubber composition. More particularly, it relates to a rubber composition having excellent appearance, fluidity, abrasion resistance and mechanical strength.

BACKGROUND ART

There have already been known thermoplastic elastomer compositions obtained by so-called dynamic crosslinking, namely, crosslinking a radical crosslinkable elastomer and a resin having no radical crosslinkability, such as polypropylene, under melt-kneading them in an extruder in the presence of a radical initiator, and these compositions are widely employed for uses such as automobile parts.

There have been known techniques which use ethylene-propylene-diene rubbers (EPDM) or olefin elastomers produced with metallocene catalysts (JP-A-9-104787) as the said elastomer compositions. However, such compositions are not necessarily sufficient in mechanical strength, and by increasing the amount of elastomer component, mechanical strength can be improved, but appearance and fluidity are considerably deteriorated. Under the circumstances, it is demanded to provide practically acceptable rubber compositions excellent in appearance, fluidity and mechanical strength.

On the other hand, thermoplastic compositions obtained by crosslinking metallocenic olefin rubbers are disclosed (JP-A-9-137001, JP-A-10-287775). However, these patent publications do not mention post-addition of a thermoplastic elastomer to the crosslinked product.

Furthermore, there are disclosed a composition obtained by crosslinking an oil-extended olefin copolymer rubber, an olefin resin and a softening agent with an organic peroxide and then adding to the crosslinked product a hydrogenated styrene thermoplastic elastomer (JP-A-3-292342), a composition obtained by subjecting to partial crosslinking an olefin rubber, an olefin resin, a softening agent and a filler with an organic peroxide and adding an A-(B-A)n type block copolymer to the crosslinked product (JP-B-3-58381), and a composition comprising a crosslinked rubber-containing thermoplastic elastomer, a styrene-based block copolymer, a softening agent and a polyolefin resin (JP-A-7-11067). The compositions disclosed in the above patent publications are improved in tackiness and bleeding properties by the post-addition of the thermoplastic elastomer, but are inferior in appearance, fluidity, abrasion resistance and mechanical strength and practically unusable because of using no specific metallocenic ethylene-α-olefin copolymer. Moreover, the above patent publications neither mention nor suggest that the abrasion resistance is remarkably improved by the post-addition of a thermoplastic elastomer to a thermoplastic crosslinked product of a metallocenic ethylene-α-olefin copolymer. Under the circumstances, demanded is a practically usable rubber composition excellent in appearance, fluidity, abrasion resistance and mechanical resistance.

DISCLOSURE OF INVENTION

In view of the problems mentioned above, the object of the present invention is to provide a rubber composition having excellent appearance, fluidity, abrasion resistance and mechanical strength.

As a result of intensive research conducted by the inventors in an attempt to solve the above problems, it has been surprisingly found that appearance, fluidity, abrasion resistance and mechanical strength are markedly improved when a thermoplastic elastomer is added later to a partially or completely crosslinked product having a specific crosslinked structure and containing a specific ethylene-α-olefin copolymer and an olefin resin, and, as a result, the above problems have been solved. Thus, the present invention has been accomplished.

That is, the present invention is a rubber composition which contains a thermoplastic partially or completely crosslinked product comprising 1–99 parts by weight of an ethylene-α-olefin copolymer (A) containing an ethylene unit and an α-olefin unit of 3–20 carbon atoms and prepared using a metallocene catalyst and 1–99 parts by weight of an olefin resin (B) (the total amount of (A) and (B) being 100 parts by weight), the crosslinking degree of the ethylene-α-olefin copolymer (A) being 50% or higher, and 1–500 parts by weight of a thermoplastic elastomer (C) added later to the crosslinked product.

BRIEF DESCRIPTION OF DRAWING

In FIG. 1, the mark "●" shows the composition prepared by the method of post-addition of (C) according to the present invention and the mark "○" shows the composition prepared by the method of initial and simultaneous addition of (C) (comparative example).

BEST MODE FOR CARRYING OUT THE INVENTION

Figure 1:
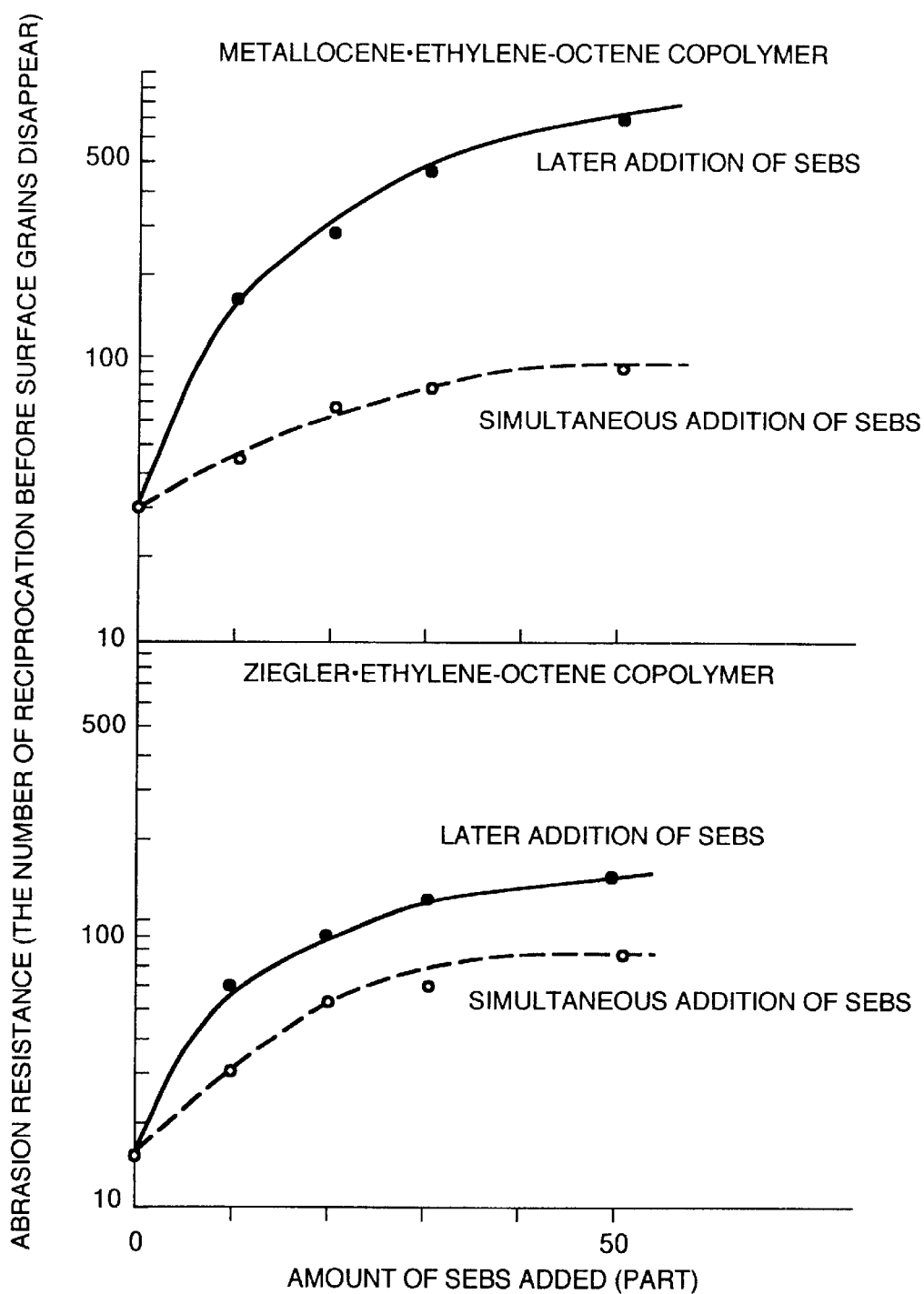
FIG. 1 is a graph which shows relations among the method of addition, the amount of (C) SEBS added and the abrasion resistance of the compositions in the examples and comparative examples of Tables 2 and 3. The abscissa axis indicates the amount of (C) added, and the ordinate axis indicates the number of friction reciprocations before the surface grains of molded products were lost which is an indication of abrasion resistance of the compositions.

The rubber composition of the present invention is a composition which contains a thermoplastic partially or completely crosslinked product comprising a specific ethylene-α-olefin copolymer (A) and an olefin resin (B), to which a thermoplastic elastomer (C) is added later.

It is important that (A) is an ethylene-α-olefin copolymer produced using a metallocene catalyst. The crystallinity of the copolymer is enhanced by using a metallocene catalyst, resulting in improvement of impact resilience. When a rubber contacts with a hard material, scars are usually left on the rubber, but when the above copolymer of high impact resilience is used, the scars are repaired and disappear. It has been found that the abrasion resistance of the copolymer produced using non-metallocene catalyst is improved only when the thermoplastic elastomer is added in a large amount while the copolymer produced using a metallocene catalyst shows conspicuous abrasion resistance even with addition of the catalyst in a relatively small amount.

It has been further found that when the crosslinking degree of (A) is 50% or higher, excellent appearance, fluidity and mechanical strength are developed, and thus the present invention has been accomplished.

The present invention will be explained on each component in detail below.

The ethylene-α-olefin copolymer (A) in the present invention is an ethylene-α-olefin copolymer containing an ethylene unit and an α-olefin unit of 3–20 carbon atoms and prepared using a metallocene catalyst (hereinafter sometimes referred to as "a copolymer rubber").

The α-olefins of 3–20 carbon atoms include, for example, propylene, butene-1, pentene-1, hexene-1, 4-methylpentene-1, heptene-1, octene-1, nonene-1, decene-1, undecene-1, and dodecene-1. Among them, hexene-1, 4-methylpentene-1 and octene-1 are preferred, and octene-1 is especially preferred. Octene-1 has an excellent effect to give flexibility even with an addition in a small amount, and the resulting copolymers are excellent in mechanical strength.

The copolymer rubbers in the present invention are produced with metallocene catalysts.

In general, a metallocene catalyst comprises a cyclopentadienyl derivative of a metal of Group IV such as titanium, zirconium or the like and a promoter, and is not only high in activity as a polymerization catalyst, but also gives copolymers narrower in molecular weight distribution and more uniform in distribution of α-olefins of 3–20 carbon atoms which are comonomer units in the copolymers as compared with polymers obtained with Ziegler catalysts. Therefore, polymers obtained by metallocene catalyst method are more uniform in crosslinking and superior in rubber elasticity.

The copolymer rubbers used in the present invention preferably have long-chain branches. Due to the presence of long-chain branches, density of the copolymer rubbers can be made smaller as compared with proportion (% by weight) of the copolymerized α-olefins without causing decrease of mechanical strength, and thus elastomers of low density, low hardness and high strength can be obtained. Olefin rubbers having long-chain branches are disclosed in U.S. Pat. No. 5,278,272, etc.

Furthermore, the copolymer rubbers preferably have a peak of melting point of DSC at a temperature not lower than room temperature. When the copolymer rubbers have a peak of melting point at a temperature not lower than room temperature, they are stable in their form at a temperature in the range of not higher than the melting point and excellent in handleability and less in tackiness.

The ethylene-α-olefin copolymer (A) in the present invention contains an ethylene unit and an α-olefin unit as essential components and, if necessary, may further contain other vinyl monomers. Furthermore, it is sufficient that ethylene and α-olefin units are contained in (A), and those copolymers are also included which finally contain ethylene and α-olefin units in the structure and which are obtained by hydrogenation of, for example, polystyrene, polyolefin, polyester, polyurethane, 1,2-polybutadiene and polyvinyl chloride thermoplastic elastomers.

Melt index of the copolymer rubber (A) used in the present invention is preferably 0.01–100 g/10 min (under load of 2.16 kg at 190° C.), more preferably 0.2–20 g/10 min. If the melt index exceeds 100 g/10 min, crosslinkability of the thermoplastic elastomer composition is insufficient, and if it is less than 0.01 g/10 min, fluidity is inferior and processability is deteriorated.

Copolymerization ratio of α-olefin in the copolymer rubber (A) used in the present invention is preferably 1–60% by weight, more preferably 10–50% by weight, most preferably 20–45% by weight. If the copolymerization ratio of α-olefin exceeds 60% by weight, decrease in hardness and tensile strength of the composition is great and if it is less than 1% by weight, hardness of the composition is high and the mechanical strength tends to decrease.

Density of the copolymer rubber (A) is preferably 0.8–0.9 g/cm$^3$. By using copolymer rubbers having a density within the above range, thermoplastic rubber compositions excellent in flexibility and low in hardness can be obtained.

The copolymer rubber (A) in the present invention may be used in admixture of a plurality of rubbers. In this case, the processability can be further improved.

The olefin resin (B) in the present invention is not limited as far as it can disperse with the copolymer rubber (A). Examples thereof are olefin resins such as ethylene resins and propylene resins.

The propylene resins usable most suitably in the present invention include, for example, isotactic polypropylene homopolymers and isotactic copolymer resins (including block and random copolymers) of propylene with α-olefins such as ethylene, butene-1, pentene-1 and hexene-1.

At least one olefin resin (B) selected from these resins is used in an amount of 1–99 parts by weight, preferably 5–90 parts by weight, more preferably 20–80 parts by weight, most preferably 20–70 parts by weight based on 100 parts by weight of (A) and (B) in total. If the amount of (B) is less than 1 part by weight, fluidity and processability of the composition is deteriorated and if it exceeds 99 parts by weight, the composition is insufficient in flexibility.

Melt index of the olefin resins used in the present invention is preferably 0.1–100 g/10 min (under load of 2.16 kg at 230° C.). If the melt index exceeds 100 g/10 min, heat resistance and mechanical strength of the thermoplastic elastomer composition is insufficient, and if it is less than 0.1 g/10 min, fluidity is inferior and molding processability is deteriorated.

The thermoplastic elastomer (C) in the present invention is not limited as far as it is a thermoplastic rubber-like polymer, but it is important that the component (C) is added later to the thermoplastic crosslinked product comprising the above components (A) and (B).

Examples of the thermoplastic elastomer are diene rubbers such as polybutadiene, poly(styrene-butadiene) and poly(acrylonitrile-butadiene) and saturated rubbers obtained by hydrogenating the above diene rubbers, isoprene rubbers, chloroprene rubbers, acrylic rubbers such as polybutyl acrylate, ethylene-propylene copolymer rubbers, ethylene-propylene-diene monomer terpolymer rubbers (EPDM) and ethylene-octene-copolymer rubbers.

Of the above thermoplastic elastomers, especially preferred are styrene thermoplastic elastomers, which are block copolymers comprising aromatic vinyl units and conjugated diene units, and more preferably block copolymers of which conjugated diene unit portion is partially hydrogenated or epoxy-modified.

The aromatic vinyl monomers constituting the above block copolymers are, for example, styrene, α-methylstyrene, p-methylstyrene, p-chlorostyrene, p-bromostyrene, and 2,4,5-tribromostyrene, and styrene is most preferred, but they may be copolymers of styrene as a main component with above-mentioned other aromatic vinyl monomers.

The conjugated diene monomers constituting the above block copolymers are, for example, 1,3-butadiene and isoprene.

The block structure of the block copolymers is preferably a linear block copolymer such as of SB, S(BS)$_n$ (n is an integer of 1–3) or S(BSB)$_n$ (n is an integer of 1–2) or a star block copolymer represented by (SB)$_n$X (n is an integer of 3–6 and X is a residue of a coupling agent such as silicon tetrachloride, tin tetrachloride or polyepoxy compound) in which the B portion is a bond center, when a polymer block comprising an aromatic vinyl unit is expressed by S and a polymer block comprising a conjugated diene and/or its partially hydrogenated unit is expressed by B. Among them, preferred are linear block copolymers of binary type of SB, triple type of SBS and quadruple type of SBSB.

In the present invention, amount of the thermoplastic elastomer (C) added is 1–500 parts by weight, preferably 5–100 parts by weight, more preferably 5–80 parts by weight, most preferably 10–50 parts by weight based on 100 parts by weight (A) and (B) in total. If the amount is less than 1 part by weight, there are no effects of improving appearance, fluidity and abrasion resistance of the composition, and if it exceeds 500 parts by weight, mechanical strength of the composition is deteriorated.

For the production of the crosslinked product comprising (A) and (B) in the present invention, it is preferred to carry out partial crosslinking with the crosslinking agent (D) because abrasion resistance, mechanical strength and heat resistance can be further improved.

It is important that the crosslinking degree of the copolymer rubber (A) is not less than 50%, and the crosslinking degree is preferably not less than 60%, more preferably not less than 70%, most preferably not less than 80%, extremely preferably not less than 90%. If the crosslinking degree is less than 50%, mechanical strengths such as tensile strength and compression set (C-set) are deteriorated.

The crosslinking agent (D) contains a crosslinking initiator (D-1) as an essential component, and, if necessary, at least one crosslinking aid selected from the group consisting of a polyfunctional monomer (D-2) and a monofunctional monomer (D-3) as optional components.

The crosslinking agent (D) is used in an amount of 0.01–20 parts by weight, preferably 0.05–10 parts by weight, more preferably 0.05–3 parts by weight based on 100 parts by weight of the composition comprising the copolymer rubber (A) and the olefin resin (B). If the amount is less than 0.01 part by weight, the crosslinking is insufficient and if it exceeds 20 parts by weight, appearance and mechanical strength of the composition are deteriorated.

Preferred crosslinking initiators (D-1) are radical initiators such as organic peroxides and organic azo compounds or phenolic crosslinking initiators. The radical initiators are especially preferred. Typical examples are peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy) valerate; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy)diisopropylbenzene, 2,5-dimethyl-2,5-bis(t-butylperoxy)hexane and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-butylperoxy acetate, t-butylperoxy isobutyrate, t-butylperoxy-2-ethyl hexanoate, t-butylperoxy lauroylate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate and cumylperoxy octenoate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl hydroperoxide.

Of these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

The above crosslinking initiator (D-1) is used in an amount of preferably 1–80% by weight, more preferably 10–50% by weight in the component (D). If the amount is less than 1% by weight, crosslinking is insufficient and if it exceeds 80% by weight, mechanical strength lowers.

In the present invention, the polyfunctional monomer (D-2) which is one component of the crosslinking agent (D) preferably has a radical polymerizable functional group as a functional group, and the functional group is most preferably vinyl group. The number of the functional group is two or more, and in the case of combination with monofunctional monomer (D-3), the number of the functional group is especially preferably three or more. Examples of the polyfunctional monomer are divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxine, p,p'-dibenzoylquinone dioxime, phenylmaleimide, allyl methacrylate, N,N'-m-phenylenebismaleimide, diallyl phthalate, tetraallyloxyethane and 1,2-polybutadiene. Triallyl isocyanurate is especially preferred. These polyfunctional monomers may also be used in combination of two or more.

The polyfunctional monomer (D-2) is used in an amount of preferably 1–80% by weight, more preferably 10–50% by weight in the component (D). If the amount is less than 1% by weight, crosslinking is insufficient and if it exceeds 80% by weight, mechanical strength lowers.

The monofunctional monomer (D-3) used in the present invention is a vinyl monomer which can control the crosslinking reaction rate or can impart functions such as adhesivity by grafting to rubbers. It is preferably a radical polymerizable vinyl monomer, and examples thereof are aromatic vinyl monomers, unsaturated nitrile monomers such as acrylonitrile and methacrylonitrile, acrylic ester monomers, methacrylic ester monomers, acrylic acid monomers, methacrylic acid monomers, maleic acid monomers, maleic anhydride monomers and N-substituted maleimide monomers.

The monofunctional monomer (D-3) is used in an amount of preferably 1–80% by weight, more preferably 10–50% by weight in the component (D). If the amount is less than 1% by weight, control of crosslinking reaction rate or impartation of functions to the component (D-3) per se is insufficient and if it exceeds 80% by weight, mechanical strength lowers.

In the present invention, a softening agent (E) can be optionally added to the crosslinked product comprising (A) and (B) in order to improve processability.

As the softening agent (E), preferred are paraffinic and naphthenic process oils. These are used in an amount of 5–250 parts by weight, preferably 10–150 parts by weight for the adjustment of hardness and flexibility of the composition. If the amount is less than 5 parts by weight, flexibility and processability are insufficient, and if it exceeds 250 parts by weight, occurrence of bleeding of the oil becomes conspicuous and this is not preferred.

The crosslinked product comprising (A) and (B) in the present invention can be improved in balancing of mechanical strength, flexibility and processability by combining the above-mentioned specific olefin elastomer (A) and olefin resin (B) with the thermoplastic elastomer (C) and the crosslinking agent (D) at a specific compositional ratio, and thus can be used preferably.

The composition of the present invention can be produced through the following processing steps. That is, there is a method which comprises subjecting the copolymer rubber (A) and the olefin resin (B) to dynamic crosslinking, if necessary, using the crosslinking agent (D), then, adding the thermoplastic elastomer (C) at the latter stage of the same extruder, and, if necessary, further adding the softening agent (E) and others, melt kneading them, and then removing the composition from the extruder. There is another method which comprises removing the crosslinked product from the extruder after completion of the crosslinking reaction and re-melting and extruding the crosslinked product and (C) to obtain the composition of the present invention. At the dynamic crosslinking reaction, above (D) may be added together with (A) and (B) from the first or may be added at the later position of the extruder. Furthermore, the above (E) may be added at the later position of the extruder or may be divided and added separately from the first and at the later position. A part of (A) and (B) may be added at the later position of the extruder.

Here, control of the crosslinking degree is carried out depending on the kinds of crosslinking initiator and crosslinking aid, the amount of them, the reaction temperature and the reaction method.

In the production method according to the present invention, there may be employed general apparatuses used for production of usual resin compositions and rubber compositions, such as Banbury mixer, kneader, single-screw extruder and twin-screw extruder. For attaining efficient dynamic crosslinking, twin-screw extruder is preferred. The twin-screw extruder is more suitable for continuous production of the composition of the present invention by uniformly and finely dispersing (A) and (B) and adding other components to allow the crosslinking reaction to take place.

Furthermore, as especially preferred melt extrusion method, there is used a twin-screw extruder which has a length L in the die direction starting from the material feed portion and has an L/D of 5–100 (D: diameter of barrel). It is preferred that the twin-screw extruder has a plurality of feed portions of a main feed portion and a side feed portion which differ in the distance from the tip portion and has kneading parts between a plurality of the feed portions and between the tip portion and the feed portion nearer from the tip portion, and the length of each kneading part is 3D–10D.

The twin-screw extruder which is one of the apparatuses for production used in the present invention may be a twin-screw extruder of same direction-revolving type or a twin-screw extruder of different direction-revolving type. The intermeshing of screw may be any of non-intermeshing type, partial intermeshing type and complete intermeshing type. When a uniform resin is to be obtained at a low temperature under application of a low shearing force, a different direction-revolving and partial intermeshing type screw is preferred. When a somewhat strong kneading is required, a same direction-revolving and complete intermeshing type screw is preferred. When a further stronger kneading is required, a same direction-revolving and complete intermeshing type screw is preferred.

In the production method of the present invention, it is more preferred that the following kneading degree is satisfied.

$$M=M=(\pi^2/2)\ (L/D)D^3(N/Q)\ 10\times10^6 \leq M \leq 1000\times10^6$$

In the above formulas, L denotes a length (mm) of an extruder in the die direction starting from a material feed portion, D denotes an inner diameter (mm) of a barrel, Q denotes a discharge amount (kg/h), and N denotes the number of revolution of the screw (rpm).

It is important that the kneading degree $M=(\pi^2/2)(L/D)D^3(N/Q)$ satisfies $10\times10^6 \leq M \leq 1000\times10^6$. If M is less than $10\times10^6$, the dynamic crosslinking does not proceed, and, hence, the crosslinking degree becomes less than 50%, resulting in deterioration of mechanical strength, and if M exceeds $1000\times10^6$, the crosslinking degree similarly becomes less than 50% owing to excess shearing force, resulting in deterioration of mechanical strength.

In order to attain the better appearance and the higher mechanical strength, it is preferred that the melting temperatures satisfy the following relationships. That is, melt kneading is first carried out at the melting temperature $T_2$ (° C.), and then melt kneading is carried out at the melting temperature $T_3$ (° C.). Especially, in a melt extruder having a length L starting from the material feed opening in the die direction, melt kneading is first carried out in an Iextruder zone of 0.1L–0.5L from the material feed opening at the melting temperature $T_2$ (° C.), and then melt kneading is carried out in the remainder zone of the extruder at the melting temperature $T_3$ (° C.).

Here, it is especially preferred that $T_1$ is 150–250° C., and $T_1$ and $T_2$ in each zone of the melt extruder may be a uniform temperature or may have a temperature gradient.

$T_1$: A temperature (° C.) such that (C) decomposes and then is reduced by half during one minute.

$T_1-100<T_2<T_1+40$ $T_2+1<T_3<T_2+200$

The thus obtained olefin elastomer composition can be made into various molded articles by optional molding methods. Preferred are injection molding, extrusion molding, compression molding, blow molding, calendering and expansion molding.

Moreover, the composition of the present invention can contain inorganic fillers and plasticizers in such an amount as not damaging the characteristics of the composition. The inorganic fillers used here include, for example, calcium carbonate, magnesium carbonate, silica, carbon black, glass fiber, titanium oxide, clay, mica, talc, magnesium hydroxide, and aluminum hydroxide. The plasticizers include, for example, polyethylene glycol, and phthalic esters such as dioctyl phthalate (DOP). Furthermore, other various additives suitably usable are, for example, flame retardant, organic and inorganic pigment, heat stabilizer, antioxidant, ultraviolet absorber, light stabilizer, silicone oil, antiblocking agent, foaming agent, antistatic agent and antifungus agent.

The thus obtained composition can be made into various molded articles by optional molding methods. Suitably usable are, for example, injection molding, extrusion molding, compression molding, blow molding, calendering and expansion molding.

The present invention will be explained in more detail by the following examples and comparative examples. They should not be construed as limiting the invention in any manner. In these examples and comparative examples, test methods employed for evaluation of various properties are shown below.

(1) Crosslinking Degree:

A composition of $W_0$ in weight was refluxed in 200 ml of o-dichlorobenzene for 20 hours, the resulting solution was filtered by a filter, the resulting swollen composition was vacuum dried at 100° C., and then the weight ($W_1$) thereof was measured again. Thus, the crosslinking degree was calculated in the following manner.

$$\text{Crosslinking degree} = W_1/W_0$$

(2) Environmental Deterioration Resistance:

A T-die extruded sheet was heated in a Geer oven under the conditions of 120° C. and 100 hours, and change in color tone was observed. The environmental deterioration resistance was evaluated by the following criteria.

⊚: Very good.

○: Good.

Δ: Good, but somewhat colored.

X: Wholly colored with no gloss.

(3) Tensile Break Strength [kgf/cm$^2$]:

Evaluation was conducted on a T-die extruded sheet at 23° C. in accordance with JIS K6251.

(4) Tensile Break Elongation [%]:

Evaluation was conducted on a T-die extruded sheet at 23° C. in accordance with JIS K6251.

(5) Appearance:

Evaluation of appearance was conducted on the surface texture of a T-die extruded sheet by the following criteria.

⊚: Very good.

○: Good.

Δ: Good, but having some surface roughness.

X: Wholly rough with no gloss.

(6) Abrasion Resistance:

A molded article was compressed to make a sheet, on which was put a stainless steel sheet of 5 cm×5 cm×2 cm having a felt fabric stuck to the under surface of the stainless steel sheet. The evaluation was conducted under the following conditions.

Apparatus: Gakushin type abrasion tester.

Temperature condition: Atmosphere of 23° C.

Stroke: 120 mm

Frequency: One reciprocation/2 seconds

Load: 1 kg

Friction material: A shirting No.3 comprising 100% of cotton cloth (in accordance with JIS L0803) which was folded in three and mounted on the tester.

Contact area: 1 cm$^2$

Evaluation was conducted by expressing the number of friction reciprocation before surface grains of the molded article disappeared or by observing the surface state and grading under the following criteria.

⊚: Very good.

○: Good.

Δ: Good, but having some flaws.

X: Flaws were seen on the whole surface.

(7) Density:

This was evaluated at 23° C. in accordance with JIS D792.

The following components were used in the examples and the comparative examples.

(a) Ethylene-α-olefin copolymers:

(1) A copolymer of ethylene and octene-1 (referred to as "TPE-1").

This was prepared by the process using a metallocene catalyst as disclosed in JP-A-3-163088. The copolymer had a compositional ratio of ethylene/octene-1 of 72/28 (weight ratio) and a density of 0.863.

(2) A copolymer of ethylene and octene-1 (referred to as "TPE-2").

This was prepared by the process using a usual Ziegler catalyst. The copolymer had a compositional ratio of ethylene/octene-1 of 72/28 (weight ratio).

(3) An ethylene-propylene-dicyclopentadiene copolymer (referred to as "TPE-3").

This was prepared by the process using a metallocene catalyst as disclosed in JP-A-3-163088. The copolymer had a compositional ratio of ethylene/propylene/dicyclopentadiene of 72/24/4 (weight ratio).

(4) A copolymer of ethylene and octene-1 (referred to as "TPE-4").

This was prepared by the process using a metallocene catalyst as disclosed in JP-A-3-163088. The copolymer had a compositional ratio of ethylene/octene-1 of 60/40 (weight ratio) and a density of 0.857.

(5) A styrene-ethylene-butylene-styrene copolymer (referred to as "SEBS") manufactured by Asahi Kasei Kogyo K.K. (trademark "Tuftech").

(6) A styrene-butadiene copolymer (referred to as "SB") manufactured by Asahi Kasei Kogyo K.K. (trademark "Tufprene").

(7) An epoxy-modified styrene-butadiene copolymer (referred to as "ESB") manufactured by Daicel Ltd. (trademark "Epofriend").

(8) An ethylene-propylene copolymer (referred to as "EPR") manufactured by Sumitomo Chemical Co., Ltd. (trademark "Esprene").

(b) A propylene resin:

An isotactic polypropylene (referred to as "PP") manufactured by Japan Polychem Co., Ltd.

(c) A paraffin oil:

DIANA Process Oil PW-380 (referred to as "MO") manufactured by Idemitsu Kosan Co., Ltd.

(d) A crosslinking initiator: Radical initiator 2,5-Dimethyl-2,5-bis(t-butylperoxy)hexane manufactured by Nippon Oil & Fats Co., Ltd. (trademark: PERHEXA 25B) (referred to as "POX").

(e) Crosslinking aids:

1) Divinylbenzene manufactured by Wako Junyaku Co., Ltd. (referred to as "DVB").

2) Triallyl isocyanurate manufactured by Nippon Kasei Co., Ltd. (referred to as "TAIC").

3) N,N'-m-phenylenebismaleimide manufactured by Ouchi Shinkou Kagaku Co., Ltd. (referred to as "PMI").

4) Maleic anhydride manufactured by Wako Junyaku Co., Ltd. (referred to as "MAH").

5) Methyl methacrylate manufactured by Asahi Kasei Kogyo K.K. (referred to as "MMA").

6) Styrene manufactured by Asahi Kasei Kogyo K.K. (referred to as "ST").

EXAMPLES 1–26 AND COMPARATIVE EXAMPLES 1–14

Each of the compositions shown in Tables 1–4 was melt kneaded at 180° C. in the following manner using as an extruder a twin-screw extruder (40 mmφ, L/D=47) having a feed opening at the central part of the barrel. A two-start screw having kneading portions before and after the feed opening was used as a screw.

Production Conditions

X: The components other than the component (C) were melt extruded at the first stage, and successively the component (C) was added at the second stage. The preset temperature was 180° C.

Y: All the components were melt extruded at a preset temperature of 180° C.

A sheet of 2 mm thick was made from the thus obtained rubber composition at 200° C. using a T-die extruder and was subjected to various evaluations. The results are shown in Tables 1–4.

TABLE 1

| Composition | Example 1 | Comp. Example 1 | Comp. Example 2 | Example 2 | Example 3 | Example 4* | Example 5 | Example 6 | Example 7 | Example 8 | Example 9 | Example 10 | Example 11 | Comp. Exam. 3 |
|---|---|---|---|---|---|---|---|---|---|---|---|---|---|---|
| The first stage (A) | 65 TPE-1 | 65 TPE-1 | 65 TPE-2 | 65 TPE-3 | | | | | | 65 TPE-1 | | | | |
| (B) PP | | | | | | | 35 | | | | | | | |
| (C) | 0 | 20 SEBS | 0 | | | | | | | 0 | | | | |
| (D) POX | 0.5 | 0.5 | 0.5 | | | | | | | 0.5 | | | | |
| DVB | 0 | 0 | 0 | | | | | | | 1.0 | | | | |
| (E) MO | 0 | 0 | 0 | | 0 | | | | | 45 | | | | |
| The second stage (C) | 20 SEBS | 0 | | 20 SEBS | 20 SEBS | 20 SEBS | 20 EPR | 20 ESB | 20 SB | 20 TPE-1 | 20 TPE-4 | 20 SEBS | 20 SEBS | 20 SEBS |
| Crosslinking degree of (A) | 90 | 91 | 90 | 90 | 92 | 91 | 90 | 93 | 91 | 92 | 91 | 90 | 50 | 90 |
| Production process | X | Y | X | X | X | X | X | X | X | X | X | X | X | X |
| Tensile break strength Tb kgf/cm² | 250 | 90 | 71 | 63 | 300 | 150 | 130 | 120 | 140 | 130 | 120 | 100 | 90 | 68 |
| Tensile break elongation % | 800 | 400 | 390 | 380 | 950 | 680 | 580 | 550 | 650 | 640 | 700 | 590 | 500 | 380 |
| MFR | 1.1 | 0.01 or less | 0.1 | 0.1 | 1.0 | 4.0 | 4.3 | 3.9 | 3.8 | 5.1 | 5.3 | 6.3 | 6.9 | 7.3 |
| Appearance | ○ | x | x | ○ | ○ | ◎ | ○ | ○ | ○ | ◎ | ◎ | ○ | ○ | x |
| Abrasion resistance | ○ | x | x | Δ | ○ | ◎ | ○ | ○ | ○ | ◎ | ◎ | ○ | ○ | x |
| Environmental deterioration resistance | ◎ | ◎ | ○ | ○ | ○ | ◎ | ○ | Δ | Δ | ◎ | ◎ | ○ | ○ | x |

Production conditions:
X: The components other than (c) were melt extruded at the first stage and successively (C) was added at the second stage. The preset temperature was 180° C.
Y: All components were melt extruded at the preset temperature of 180° C.
*: This shows more preferred Example.

TABLE 2

| | Example | | | | Comparative Example | | | | |
|---|---|---|---|---|---|---|---|---|---|
| Composition | 12 | 13 | 14 | 15 | 4 | 5 | 6 | 7 | 8 |
| The first stage (A) | | | | 70 TPE-1 | | | | | |
| (B) PP | | | | 30 | | | | | |
| (C) SEBS | | | 0 | | 0 | 10 | 20 | 30 | 50 |
| (D) POX | | | | 0.5 | | | | | |
| DVB | | | | 1.0 | | | | | |
| (E) MO | | | | 40 | | | | | |
| The second stage (C) SEBS | 10 | 20 | 30 | 50 | 0 | | 0 | | |
| Crosslinking degree | 77 | 76 | 74 | 75 | 76 | 76 | 76 | 76 | 76 |
| Production process of (A) | X | X | X | X | Y | Y | Y | Y | Y |
| Abrasion resistance (the number of receiprocation before surface grains disappear) | 160 | 270 | 450 | 680 | 30 | 44 | 68 | 80 | 92 |

Production conditions:
X: The components other than (c) were melt extruded at the first stage and successively (C) was added at the second stage. The preset temperature was 180° C.
Y: All components were melt extruded at the preset temperature of 180° C.

TABLE 3

| Composition | | Example | | | | Comparative Example | | | | |
|---|---|---|---|---|---|---|---|---|---|---|
| | | 16 | 17 | 18 | 19 | 9 | 10 | 11 | 12 | 13 |
| The first stage | (A) | | | | | 70 TPE-1 | | | | |
| | (B) PP | | | | | 30 | | | | |
| | (C) SEBS | | | 0 | | 0 | 10 | 20 | 30 | 50 |
| | (D) POX | | | | | 0.5 | | | | |
| | DVB | | | | | 1.0 | | | | |
| | (E) MO | | | | | 40 | | | | |
| The second stage | (C) SEBS | 10 | 20 | 30 | 50 | 0 | | 0 | | |
| Crosslinking degree of (A) | | 76 | 75 | 75 | 77 | 75 | 75 | 75 | 75 | 75 |
| Production process | | X | X | X | X | Y | Y | Y | Y | Y |
| Abrasion resistance (the number of receiprocation before surface grains disappear) | | 60 | 90 | 120 | 145 | 15 | 30 | 52 | 60 | 80 |

Production conditions:
X: The components other than (c) were melt extruded at the first stage and successively (C) was added at the second stage. The preset temperature was 180° C.
Y: All components were melt extruded at the preset temperature of 180° C.

TABLE 4

| Composition | | | | Example | | | | | | | Comp. Example |
|---|---|---|---|---|---|---|---|---|---|---|---|
| | | | | 20 | 21 | 22 | 23 | 24 | 25 | 26 | 14 |
| The first stage | (A) | | | | | | | 70 TPE-1 | | | |
| | (B) PP | | | | | | | 30 | | | |
| | (C) | | | | | | | 0 | | | |
| | (D) POX | | | | | | | 0.5 | | | |
| | Cross-linking aid | kind | | DVB | TAIC | PMI | PVB/ST | TAIC/MMA | | TAIC | |
| | | amount | | 1.0 | 1.0 | 1.0 | 0.5/0.5 | 0.5/0.5 | | 1.0 | |
| | E (MO) | | | | | | | 20 | | | |
| The second stage | (C) | | | | | | | 20 SEBS | 5 | 1 | 0 |
| Crosslinking degree of (A) | | | | 92 | 98 | 99 | 93 | 96 | 98 | 98 | 98 |
| Production process | | | | X | | | | | | | |
| Tensile break strength Tb kgf/cm² | | | | 300 | 280 | 290 | 290 | 320 | 200 | 120 | 95 |
| Tensile break elongation % | | | | 970 | 920 | 930 | 980 | 970 | 830 | 730 | 420 |
| MFR | | | | 3.5 | 3.0 | 3.1 | 3.7 | 3.5 | 2.5 | 1.8 | 0.01 or less |
| Appearance | | | | ◉ | ○ | ○ | ◉ | ◉ | ◉ | ○ | x |
| Abrasion resistance | | | | ◉ | ◉ | ◉ | ◉ | ◉ | ◉ | ○ | x |
| Environmental deterioration resistance | | | | ◉ | ◉ | ◉ | ◉ | ◉ | ◉ | ○ | x |

Production conditions:
X: The components other than (c) were melt extruded at the first stage and successively (C) was added at the second stage. The preset temperature was 180° C.
Y: All components were melt extruded at the preset temperature of 180° C.

According to the results shown in Tables 1–4, it can be seen that the products obtained by first preparing a crosslinked product and then adding (C) thereto are superior in appearance, mechanical strength, fluidity and abrasion resistance to the products obtained by crosslinking the thermoplastic elastomer (C) which is a rubber-like polymer together with the copolymer rubber (A) in carrying out the dynamic crosslinking. Furthermore, use of the copolymer rubber prepared using a metallocene catalyst as (A) imparts further excellent characteristics mentioned above, and especially the copolymer of ethylene and octene-1 prepared using a metallocene catalyst imparts further excellent environmental deterioration resistance in addition to the above characteristics.

INDUSTRIAL APPLICABILITY

Since the rubber compositions of the present invention have excellent appearance, fluidity, abrasion resistance and mechanical strength, they can be used for a wide variety of uses such as automobile parts, interior automobile trims, air bag covers, mechanical parts, electric parts, cables, hoses, belts, toys, miscellaneous goods, daily necessaries, construction materials, sheets, films and others. Thus, they have a great role in industry.

What is claimed is:

1. A rubber composition which contains a thermoplastic crosslinked product comprising 1–99 parts by weight of an ethylene-α-olefin copolymer (A) containing an ethylene unit and an α-olefin unit of 3–20 carbon atoms and prepared using a metallocene catalyst and 1–99 parts by weight of an olefin resin (B) (the total amount of (A) and (B) being 100 parts by weight), the crosslinking degree of (A) being 50% or higher, and 1–500 parts by weight of a thermoplastic elastomer (C) added later to the crosslinked product.

2. A rubber composition according to claim 1 which contains the thermoplastic elastomer in an amount of 10–50 parts by weight.

3. A rubber composition according to claim 1 or 2, wherein the ethylene-α-olefin copolymer is a copolymer of ethylene and an α-olefin of 6–12 carbon atoms.

4. A rubber composition according to claim 1 or 2, wherein the olefin resin is a propylene resin.

5. A rubber composition according to claim 1 or 2, wherein the thermoplastic elastomer is a styrene thermoplastic elastomer.

6. A rubber composition according to claim 1 or 2, wherein the thermoplastic elastomer is a saturated rubber obtained by hydrogenating a diene rubber.

7. A rubber composition according to claim 1 or 2, wherein the thermoplastic elastomer is a block copolymer obtained by hydrogenating a block copolymer comprising a polymer block mainly composed of an aromatic vinyl unit and a polymer block mainly composed of a conjugated diene unit.

8. A rubber composition according to claim 1 or 2 which is crosslinked with a crosslinking agent (D).

9. A rubber composition according to claim 1 or 2 which additionally contains a softening agent (E).

* * * * *